INVENTOR.
Keith R. Thompson.
BY
Harness, Dickey & Pierce
ATTORNEYS.

INVENTOR.
Keith R. Thompson.
BY
Harness, Dickey & Pierce
ATTORNEYS.

May 18, 1954     K. R. THOMPSON     2,678,576
MACHINE-OPERATED WRENCH AND CONTROL MEANS THEREFOR
Filed April 28, 1949     4 Sheets-Sheet 4
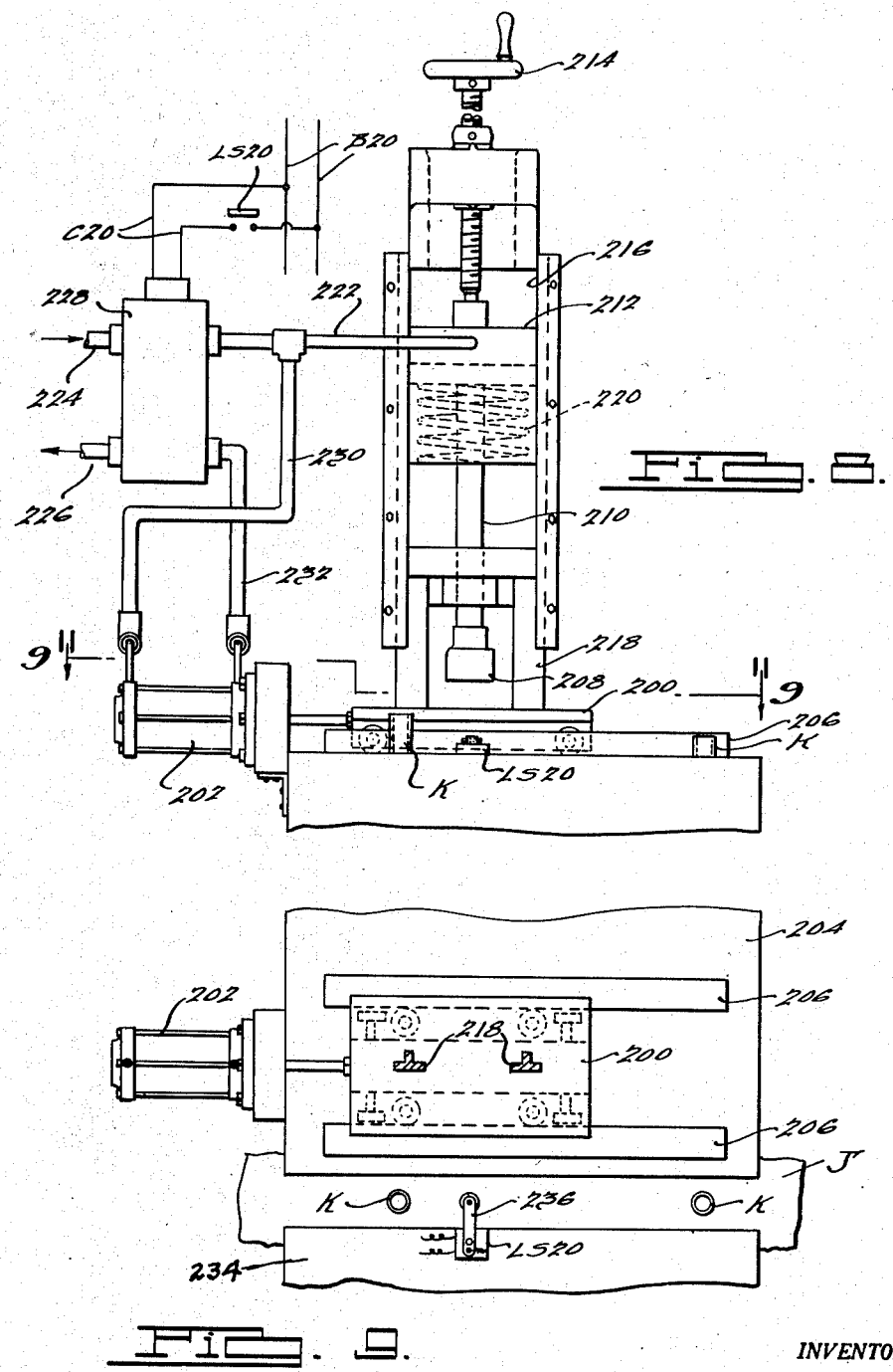
INVENTOR.
Keith R. Thompson.
BY
Harness, Dickey & Pierce.
ATTORNEYS.

Patented May 18, 1954

2,678,576

UNITED STATES PATENT OFFICE 2,678,576

MACHINE-OPERATED WRENCH AND CONTROL MEANS THEREFOR

Keith R. Thompson, Monroe, Mich., assignor to Monroe Auto Equipment Company, Monroe, Mich., a corporation of Michigan Application April 28, 1949, Serial No. 90,219

7 Claims. (Cl. 81—54)

This invention relates to mass production apparatus and more particularly to movable automatic production tools.

It is the principal object of the invention to provide an automatic production tool which is movable with and actuated by moving workpieces, e. g., workpieces or allied parts carried by a conveyer.

In order to accomplish this and other objects, the invention contemplates the use of a carriage which is movable alongside the conveyer. This movement may be caused by the conveyer or by separate means but in either case it is controlled by suitable means which is actuated during successive periods by contact with successive workpieces or parts being moved thereby on the conveyer. The tool required to perform the desired operation on the workpiece is mounted on the carriage and is therefore movable beside and in operative relationship to a workpiece. The control means which regulates the actuation of the carriage also governs the tool so that in net effect the invention achieves automatic synchronism between the tool and successive workpieces.

The tools illustrated herein are used to perform desired operations in the production of shock absorbers; however, it will be recognized that the invention is not limited in this respect but is equally well adapted to perform other operations upon other parts. In the drawings.

Figure 2:
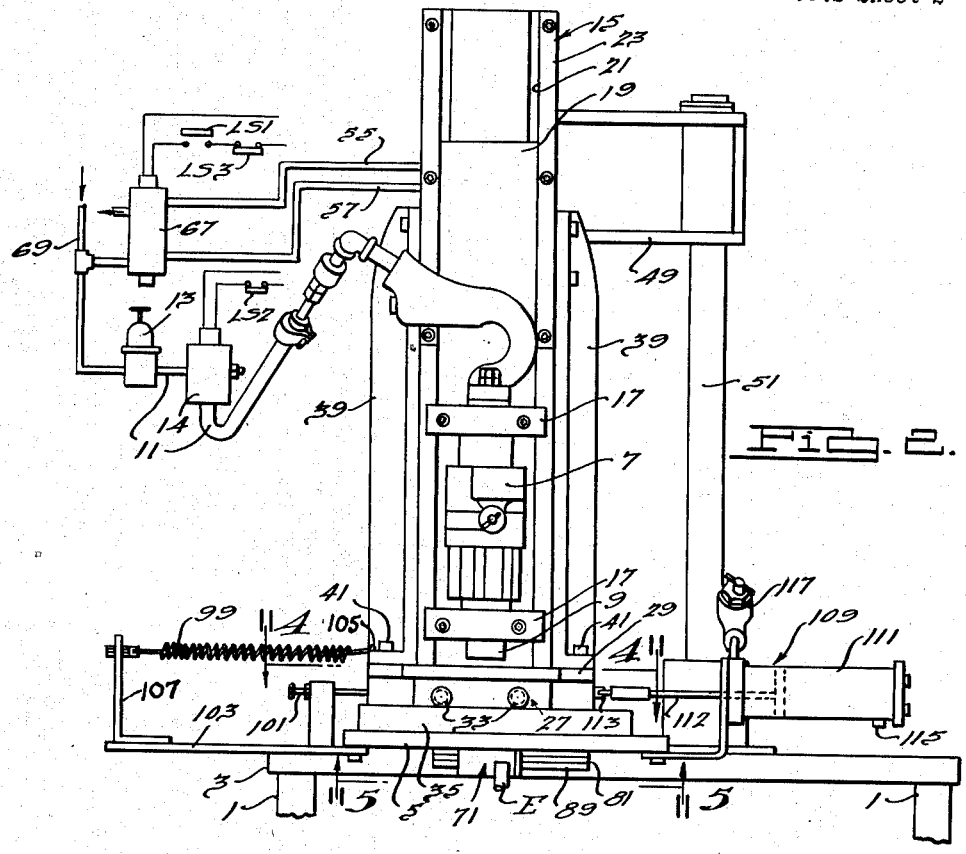
Fig. 2 is a front elevation of the device shown in Fig. 1.
Figure 5:
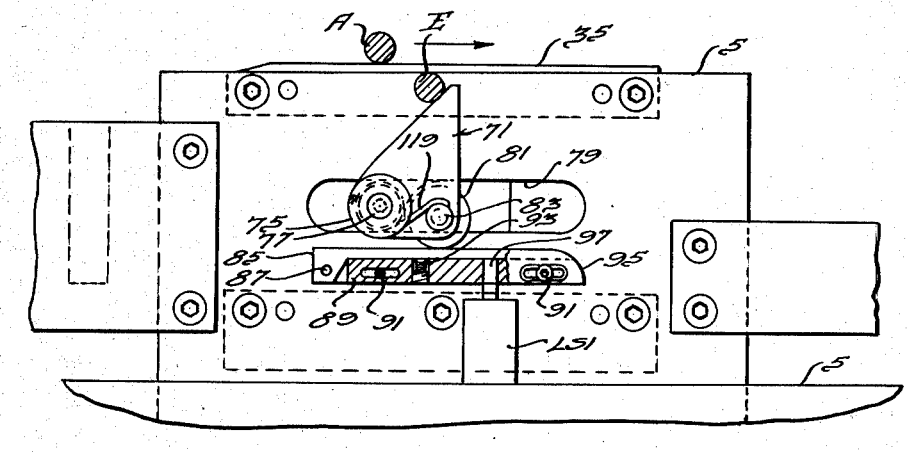
Figure 6:
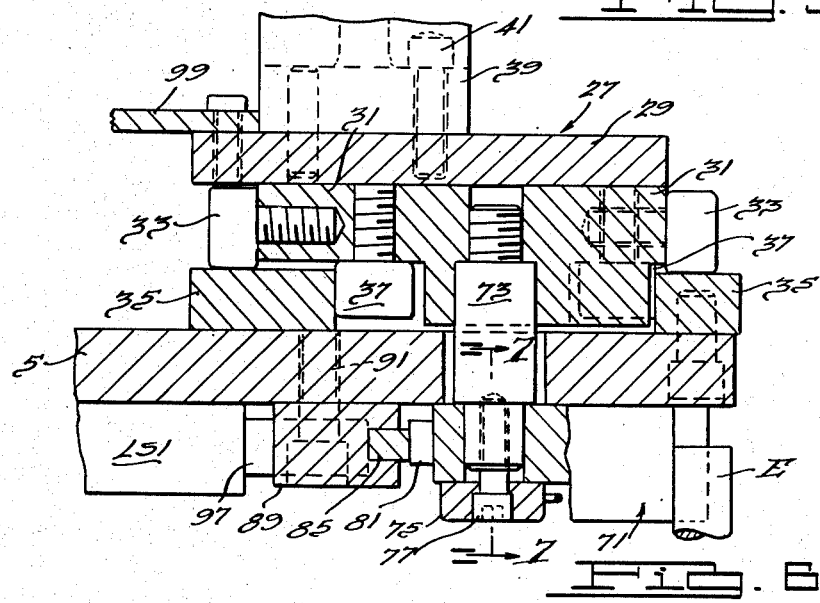
Figure 7:
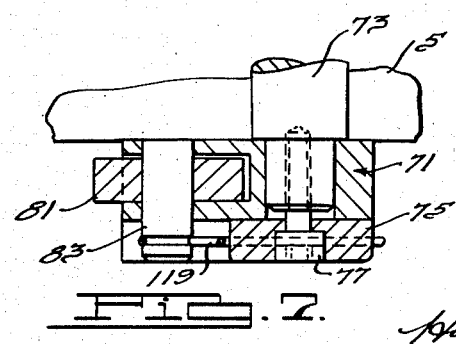

Fig. 4 is a section taken on line 4—4 of Fig. 2;
Fig. 5 is a section taken on line 5—5 of Fig. 2;
Fig. 6 is a section taken on line 6—6 of Fig. 4;
Fig. 7 is a section taken on line 7—7 of Fig. 6;
Fig. 8 is a front elevation with parts broken away and with the control circuit shown diagrammatically of a modified form of the invention, and Fig. 9 is a section taken on line 9—9 of Fig. 8.

Figure 1:
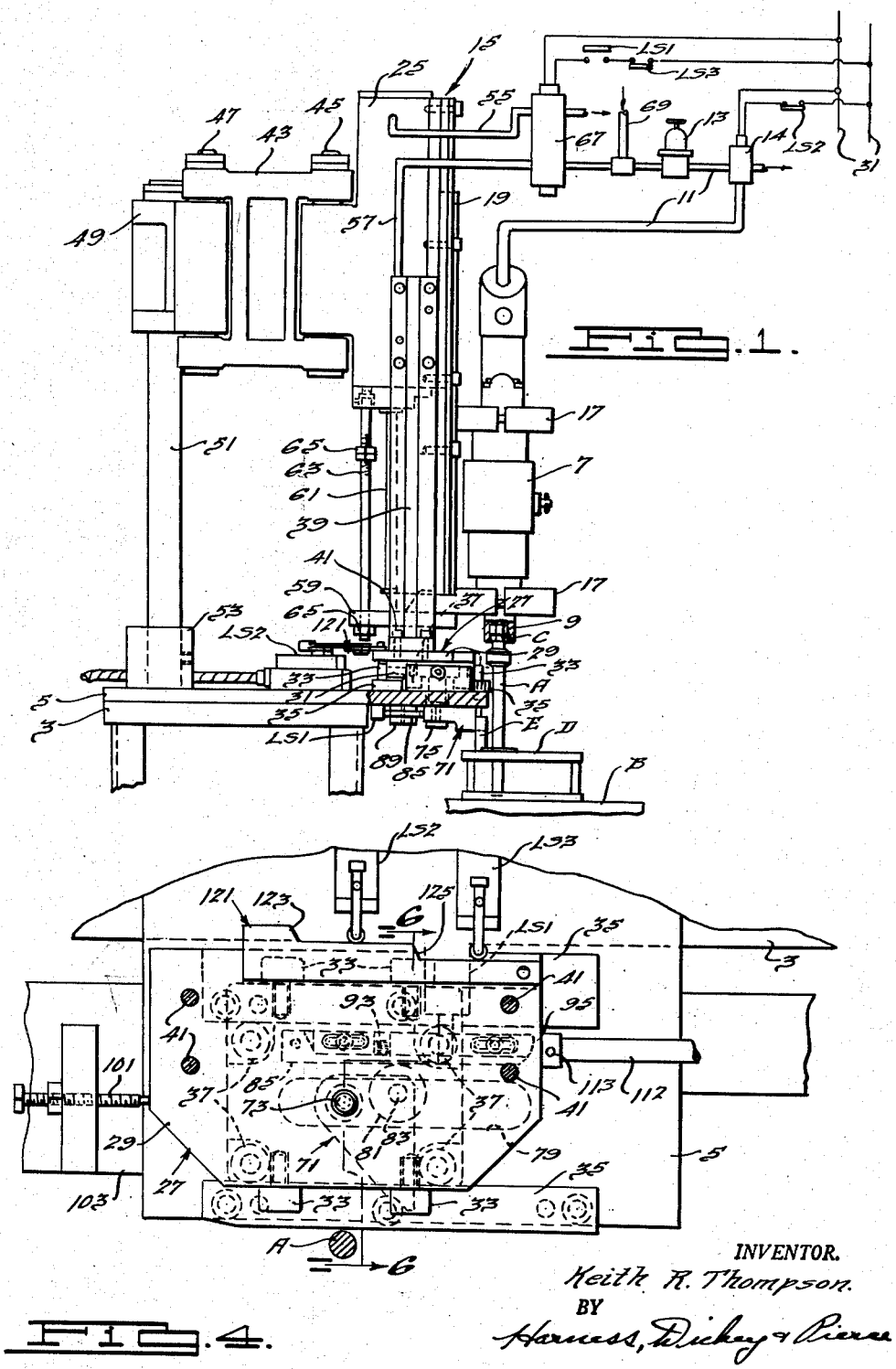
Figure 1 is a side elevation with parts broken away and with the control circuit shown diagrammatically of one form of the invention.
Figure 3:
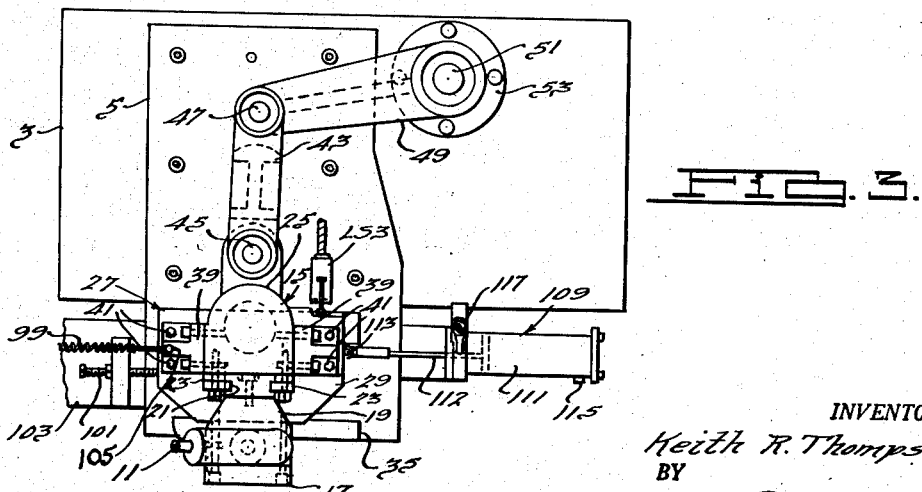
Fig. 3 is a plan view of the device shown in Fig. 1.

As shown in Figs. 1–3, the machine has a suitable fixed frame which includes legs 1 that support a table plate 3. An additional plate 5 may be bolted to the table 3 so that it overhangs the fixed frame and terminates adjacent parts A which are carried thereby on the conveyer B (Fig. 1). The part A has a nut C which is automatically tightened by apparatus to be described as it is carried by the conveyer B in a rightward direction in Fig. 2. The part A is of course clamped to the conveyer B by means of a suitable fixture D.

The mechanism for tightening the nut C includes preferably a rotary air motor 7 that has a suitable socket 9 for operative engagement with the nut. Motors of this type are procurable on the open market. Air may be fed to the motor 7 through the conduit 11 which contains a suitable pressure regulator 13 and a solenoid-operated three-way valve 14. The regulator 13 provides a control of the maximum pressure delivered to the motor 7 and thus regulates the torque with which the motor tightens the nut C.

In addition to its rotary motion, the socket 9, and therefore the motor 7, must have vertical movement so as to engage and disengage it with the nut C and also horizontal translatory movement so that the nut-tightening process may be conducted while the part A is being moved by the conveyer B.

Vertical movement of the motor 7 is permitted by slidably attaching it to the head 15. For this purpose suitable brackets 17 secure the motor 7 to a built-up slide 19 that is reciprocable in ways 21 in the head 15. As best indicated in Fig. 2, the ways 21 may be provided by a plurality of plates 23 that are bolted to the face of an air cylinder 25 which comprises a portion of the head 15.

Horizontal movement of the motor 7 is accomplished by horizontal movement of the entire head 15. For this purpose the head 15 is mounted on a carriage 27 that moves reciprocably on the plate 5 in a direction parallel to and in juxtaposition to the conveyer B. As shown best in Figs. 1 and 6, this carriage includes a top plate 29 and plates 31 affixed to the underside of the plate 29, and two pairs of rollers 33 extend laterally from the plates 31 and ride upon spaced rail bars 35 that are secured to the surface of plate 5. In order to prevent undesirable transverse movement, rollers 37 having vertical axes may be secured to the plates 31 and disposed to ride upon the inside vertical faces of the rails 35. The head 15 is attached to the carriage 27 by means of upright T bars 39 that are bolted to the sides thereof and secured by bolts 41 at their lower ends to the carriage top plate 29. It will thus be evident that head 15 and the motor 7 are capable of horizontal movement with the carriage 27 in directions defined by the rails 35.

Additional support for the head 15 is also provided. This includes an arm 43 that is pivoted at 45 to the casing of air cylinder 25. The arm 43 is pivotally connected at 47 to another arm 49 that is pivoted on the upright rod 51. The rod 51 is suitably supported in a socket bracket 53 that is affixed to the table 3. By means of the articulated connection provided by arms 43 and 49, the rod 51 furnishes support to the head 15 without interfering with its movement on the carriage 27.

The slide 19, and thus the motor 7, is moved in its ways 21 by the air cylinder 25 which receives and exhausts air from its upper and lower ends by conduits 55 and 57, respectively. A block 59 is secured to the end of the cylinder piston rod 61 and is also affixed to the lower end of the slide 19 whereby movement of the rod results in vertical movement of the slide and motor 7. The block 59 is guided on a rod 63 which extends below the cylinder. Adjustable stop nuts 65 on the rod 63 engage the block to regulate the stroke of the cylinder piston. The conduits 55 and 57 to the cylinder 25 are controlled by a spring-biased, solenoid-operated, four-way valve 67. A pressure line 69 supplies air to the valve 67 and may also be used to supply air to the regulator 13 for the motor 7.

Horizontal movement of the carriage 27, and thus the motor 7, is, in this embodiment, empowered by the conveyer B. For this purpose the fixture D has an upright pin E which rides beneath the plate 5 and engages a finger 71 (Figs. 4–7). The finger 71 is of generally triangular or bell-crank shape and is pivoted on the pin 73, a cap 75 and a cap screw 77 serving to preserve this connection as recognized from Figs. 6 and 7. The pin 73 extends upwardly through an elongated slot 79 in the overhang of plate 5 and threads into the plate 31 of the carriage 27 and provides means whereby force applied by the pin E to the finger 71 may move the carriage. The other free end of finger 71 carries a roller 81 that is pivoted to the finger by a pin 83. The roller 81 rides on a lever 85 that is pivoted at its up conveyer end by a pin 87 in an elongated recess that is formed in a side of a rail 89 that is secured by bolts 91 to the underside of the plate 5. A spring 93 that is disposed in a suitable aperture in the rail urges the lever 85 outwardly from the rail and against the roller 81. The lever 85 and rail 89 are rounded at their down conveyer ends as shown at 95. The lever 85 and rail 89 serve two purposes. First, the fixed rail defines the path of travel of the roller 81 and thus prevents pivoting of the finger 71 away from pin E. Force from this pin therefore moves the carriage 27. However, when the roller 81 reaches curved end 95 of the rail and lever, it loses its lateral support and the finger 71 is permitted to pivot on pin 73 away from the pin E so that the fixture D is disconnected from the carriage 27. The second purpose served by the lever 85 and rail 89 is the actuation of a limit switch LS1 which is secured to the underside of plate 5. This switch has its stem 97 extending through a suitable aperture in the rail so that it is contacted by the lever 85 and closed whenever the roller 81 is in a position to overcome the force of spring 93. The limit switch LS1 is used to partially control the cylinder 25 as will be described hereinafter.

From the foregoing it is evident that the pin E acting through finger 71 drives the carriage 27 in the down conveyer direction until the roller 81 rides around curved rail end 95. When this occurs it is necessary to return the carriage to its initial up conveyer position. This is conveniently accomplished in the present embodiment by a tension spring 99 that yieldably biases the carriage to a predetermined position as determined by an adjustable stop 101 that is affixed to a plate 103 secured to the underside of plate 5. The spring 99, which is connected by a pin 105 to the carriage and by a bracket 107 to the plate 103, is energized by down conveyer movement of the carriage 27 and, upon release of the finger 71 and pin E, pulls the carriage back against the stop 101. This movement is controlled and cushioned by a one-way orifice arrangement 109. This includes an air cylinder 111 that is secured in a suitable manner to plate 5 having a piston therein with its rod 112 pivoted to the carriage at 113. The distal outlet 115 of the cylinder is open to freely admit and exhaust air therefrom, but the proximal outlet has a variable orifice 117 connected thereto. Thus while the carriage is free to move toward the outlet 115 of the cylinder 111, when it is forced to return by the spring 99 the orifice 117 controls the rate of efflux of air from the cylinder 11 and thus the rate of movement of the carriage 27.

During return of the carriage it is desirable, for reasons to become apparent hereinafter, that lever 85 remain in expanded condition under the influence of spring 93 so that the limit switch LS1 remains open. This is possible, of course, because there is no force on finger 71 tending to pivot the roller against the lever 85. In order to maintain contact of roller and lever, a spring wire 119 may be connected to the cap 75 and pin 83 arranged to hold the roller 81 against the lever 85 with a force that is insufficient to overcome spring 93. Thus the limit switch LS1 will remain open until a pin E engages finger 71, which is held in the pin's path by spring 93, to pivot it about pivot 73 so that the roller 81 is forced against the lever 85 to close the switch.

Two additional switches are also actuated by down conveyor movement of the carriage 27. These are switches LS2 and LS3, which are mounted on plate 5 as shown in Fig. 4. LS2 controls the solenoid valve 14 and thus the air motor 7, while LS3, in conjunction with LS1, controls the pressure cylinder 25. The switches LS2 and LS3 are contacted by the edge of a cam plate 121 that is affixed to the top plate 29 of the carriage 27 and moves therewith. The cam plate 121 has two lateral switch contacting surfaces 123 and 125 which actuate the switches LS2 and LS3 respectively upon down conveyer movement of the carriage 27. Surface 123 is arranged to contact switch LS2 slightly before surface 125 contacts switch LS3.

Switch LS2 is normally closed so that the solenoid valve 14 is energized to permit flow of air through line 11 to rotate the motor 7. When contacted by the surface 123, it is opened to stop rotation of the motor. As will become evident hereinafter, this occurs before the motor 7 is lifted by the cylinder 25.

Switch LS1 which is operated by roller 81 is normally open but its companion switch LS3 is normally closed. Thus, when the roller 81 depresses lever 85 to close LS1 the solenoid four-way valve 67 is energized by connection to the bus line B1 to connect pressure line 69 to line 55 leading to the top of cylinder 25. This forces the slide 19 and motor 7 downwardly. However, when the cam surface 125 contacts the switch LS3 it opens it and de-energizes the solenoid valve 67. This valve is yieldably biased to connect the line 69 to the line 57 that leads to the bottom of the cylinder 25. Thus, when switch LS3 is opened by cam surface 125, the slide 19 and motor 7 are lifted.

When the carriage 27 is pressed against the stop 101 by spring 99, the switch LS2 is closed so that the motor 7 is rotating the socket 9. The switch LS1 is open so that the spring-biased solenoid valve 67 connects the lower side of the cylinder 25 to pressure and the upper side to exhaust and thereby holds the slide 19 and motor 7 in elevated position. Furthermore, the spring 93 presses the lever 85 outwardly and the roller 81 of finger 71 rides thereon so that its free end is pivoted about pin 73 into the path of approaching pins E on the conveyer B.

When a pin strikes the finger 71 it exercises a torque that tends to pivot the finger about pin 73 so that the finger will be disconnected therefrom. This is prevented, however, by contact of the roller 81 with the lever 85 and rail 89. By virtue of the torque exercised by pin E on the finger 71, this contact overcomes resistance of spring 93 so that the finger 85 is pressed by roller 81 against the stem 97 of the switch LS1 to close the switch. Closing of switch LS1 energizes the solenoid of valve 67 and the upper end of cylinder 25 is connected to pressure line 69 so that the motor 7 and socket 9 are lowered onto the nut of the workpiece A. Inasmuch as the socket 9 is rotating at this time, the nut will be automatically fitted into the socket.

The pin E carries the carriage along with the conveyer while the socket 9 is tightening the nut with no more than a maximum torque determined by regulator 13. During this movement the pin 73 travels in slot 75 of the plate 5 while the roller 81 rides on lever 85 and rail 89. The cam surfaces 123 and 125 are also moving toward their switches LS2 and LS3. After predetermined movement of the carriage, the cam surface 123 contacts switch LS2 and de-energizes the valve 14 so that pressure to the motor 7 is cut off and tightening of the nut, if it has not already stopped due to maximum torque limitations, is stopped. The cam surface 125 then contacts switch LS3 to de-energize the solenoid of valve 67 and raise the slide 19 and motor 7. Since this takes place while the motor 7 is de-energized, there can be no burring or smearing of the edges of the nut. At about this time the roller 81 reaches the rounded surface 95 of the lever 85 and rail 89. The torque applied by pin E therefore pivots the finger about pin 73 so that the finger 71 is disconnected from the pin E and the conveyer B.

When the finger 71 is disconnected from pin E, the spring 99 applies a restoring force to the carriage 27 to pull it back against stop 101 at a rate regulated by the opening of valve 117. This of course pulls the cam surface 125 away from switch LS3 so that it closes again. Energization of valve 67 is prevented, however, because spring 93 is sufficient to press the lever 85 and roller 81 outwardly so that the switch LS1 assumes its normally open position. Thus the slide 19 remains in elevated position. When the cam surface 123 is retracted from switch LS2, the latter closes to energize valve 14 and therefore renew rotation of the motor 7. It will be recognized, therefore, that when the carriage 27 reaches a position of rest against stop 101 that it is ready to begin another cycle.

In the modified form of Figs. 8 and 9 the carriage 200 is movable on the table or fixed surface 204 by the pressure cylinder 202 which may be suitably affixed to the side of the table as shown. Fixed rails 206 guide the carriage so that its movement is parallel to and in juxtaposition to the conveyer J which carries the workpieces K, the latter comprising, in this case, tubes which are to be pressed or forced into an associated part (not shown). This operation on the tubes K is performed by a ram 208 which forms the lower end of the upwardly biased piston and rod assembly 210 that comprises a part of the pressure cylinder 212. The pressure cylinder 212 is slidably mounted for vertical adjustment by handle 214 in suitable ways 216 that form a part of the frame structure 218, the latter being fixed to the carriage 200 for movement therewith. It will be appreciated that the adjustment provided by handle 214 is merely to adapt the ram mechanism to the workpiece K and that during actual operation it is only the piston rod assembly 210 and the ram 208 which move relatively to the carriage 27.

As mentioned, the ram 208 is biased upwardly, this being accomplished by a spring 220 within the cylinder 212. Downward movement of the ram is caused by the admission of air to the top of the piston assembly 210 through conduit 222. This conduit is connected to the pressure line 224 through a solenoid four-way valve 228 which, however, is spring-biased to connect the line 222 to the exhaust 226. The pressure cylinder 202 for moving the carriage 200 is also controlled by the valve 228. The left or down conveyer end of the cylinder 202 is connected by line 230 to the conduit 222 so that when the carriage is moved with the conveyer J the ram 208 will be moved downwardly to contact a workpiece K. The right end of cylinder 202 is connected to the other end of the four-way valve 228 through conduit 232.

The solenoid valve 228 is electrically connected to the buses B20 by leads C20, and its energization is under the control of the normally open limit switch LS20. The switch LS20 is mounted on a fixed table or surface 234 that is alongside the conveyer J and has an actuator finger that is spring biased into the path of workpieces K passing thereby.

The operation of the embodiment of Figs. 8 and 9 is more or less self-evident. Since the valve 228 is biased to connect the lines 222 and 230 to exhaust 226, the ram 208 will be elevated and the carriage 200 will be in its extreme down conveyer position (i. e., to the left) so long as the finger 236 of switch LS20 is not contacted by a workpiece K. However, when this finger is moved by an oncoming workpiece, the switch LS20 is closed to energize the valve 228 and connect lines 222 and 230 to pressure line 224 and line 232 to exhaust 226. This enables the pressure to force the ram 208 downwardly and contact of the ram with the workpiece is maintained since the cylinder 202 is actuated to move the carriage 200 in the direction of conveyer movement, it being understood that the rate of this movement is regulated by suitable orifice means so that it corresponds to that of the conveyer J. When the workpiece passes out of contact with the switch arm 236, the switch LS20 is opened with the result that the valve 228 is de-energized and the ram 208 is raised and the carriage is moved back to its extreme leftward position.

It will be recognized from the two embodiments that the invention is capable of modification, hence it is not intended to limit it to the precise details shown.

What is claimed is:

1. In a production machine for tightening nuts or the like on workpieces carried by a moving conveyor, the combination of a frame, a carriage on the frame movable alongside the conveyor, a finger pivoted on the carriage and having a portion capable of projecting into the path of an object carried on the conveyor, a fixed rail on the frame having a movable side yieldably biased toward and engaging said finger to hold said projecting portion in said path, said rail terminating on the down-conveyor side at a position corresponding to the desired end of the carriage stroke, the pivotal axis of said finger being located between said projecting portion and said rail whereby forces from the conveyor on the finger pivot it and the movable side against said rail and upon passage of the finger beyond the end of the rail it is pivoted out of said path, a switch connected to said movable side and operated by its movement, a nut runner mounted on the carriage and movable toward and away from the conveyor, means for moving said nut runner toward and away from the conveyor, forward movement by said last means being controlled by said switch, another switch for controlling aft movement of said last means, a first cam mounted on the carriage and operatively connected to said last switch at a predetermined portion in the stroke of the carriage, means for rotating the nut runner, a switch for controlling said rotating means, said last switch being normally closed so that said rotating means is normally operative, and a second cam mounted on the carriage and operatively connected with said last switch before the first cam is connected to its switch whereby said rotating means is made inactive before the nut runner is moved aft.

2. In a production machine for operating upon workpieces carried by a moving conveyor and having a frame, the combination of a carriage movable relative to the frame alongside the conveyor between initial and final positions, means whereby the conveyor moves the carriage comprising a finger mounted on the carriage and movable therewith between said initial and final positions, said finger being movable relative to said carriage between an operative position in which it is adapted to be engaged and driven by said conveyor and an inoperative position in which it is not engaged by said conveyor, a guide member fixed on said frame and engaging said finger when said conveyor is between said initial and final positions and holding said finger in its operative position, said guide member terminating so that it does not hold said finger in its operative position beyond the final position of said carriage whereby said finger is movable to said inoperative position, a tool carried by the carriage and mounted thereon for movement relative thereto toward and away from the conveyor and also operatively movable to work on said workpiece, means for operatively moving said tool, means for moving the tool toward the conveyor, means for moving the tool away from the conveyor, said guide member including a yieldable portion compressed by engagement with said finger, and means actuated by compression of said yieldable portion for controlling operation of one of said tool moving means.

3. The invention set forth in claim 2 wherein said yieldable portion has a spring means pressing it against the finger, and spring means urging the finger against the member portion, the spring means pressing the yieldable portion exerting greater force than the spring means urging the finger whereby the yieldable portion may be expanded when the finger it is not engaged by the conveyor.

4. The invention set forth in claim 2 wherein said last-mentioned means controls operation of the means for moving the tool toward the conveyor and upon expansion of said yieldable portion acts to prevent the tool from moving toward the conveyor, a switch controlling operation of the means for operatively moving the tool, and a cam carried by the carriage and engageable with the switch before the carriage reaches said final position and operating the switch to discontinue operative movement of the tool.

5. The invention set forth in claim 4 wherein said switch is normally closed and is opened by said cam and said tool is operatively moving continuously except when the switch is engaged by said cam.

6. The invention set forth in claim 2 including means for controlling operation of another of said tool moving means and comprising a switch biased to non-operating position and a cam on said carriage operating said switch when said carriage is adjacent said final position.

7. The invention set forth in claim 2 wherein said last-mentioned means includes a first switch that controls operation of the means for moving the tool toward the conveyor, means for controlling operation of the means for moving the tool away from the conveyor comprising a second switch and a first cam carried by the carriage and operating the second switch, and means for controlling operation of the means for operatively moving the tool comprising a third switch and a second cam carried by the carriage and operating the third switch.

References Cited in the file of this patent

UNITED STATES PATENTS

| Number | Name | Date |
| --- | --- | --- |
| 582,195 | Gibbs | May 11, 1897 |
| 723,995 | Ellis | Mar. 31, 1903 |
| 938,522 | Swain | Nov. 2, 1909 |
| 1,754,978 | Buss | Apr. 15, 1930 |
| 1,859,319 | Sussman | May 24, 1932 |
| 1,960,719 | Stibbs | May 29, 1934 |
| 1,985,864 | Kronquest | Dec. 25, 1934 |
| 2,034,740 | Brandt | Mar. 24, 1936 |
| 2,163,930 | Beiderman | June 27, 1939 |
| 2,253,367 | Di Prima | Aug. 19, 1941 |
| 2,336,573 | Seeley | Dec. 14, 1943 |